US011654322B2

(12) United States Patent
Fausti et al.

(10) Patent No.: US 11,654,322 B2
(45) Date of Patent: May 23, 2023

(54) TRANSLATIONAL-ROTARY MACHINE

(71) Applicant: POLIBRIXIA S.R.L., Brescia (IT)

(72) Inventors: Davide Fausti, Brescia (IT); Massimo Antonini, Brescia (IT); Giovanni Fusi, Brescia (IT); Rodolfo Faglia, Brescia (IT)

(73) Assignee: POLIBRIXIA S.R.L., Brescia (IT)

( * ) Notice: Subject to any disclaimer, the term of this patent is extended or adjusted under 35 U.S.C. 154(b) by 703 days.

(21) Appl. No.: 16/709,586

(22) Filed: Dec. 10, 2019

(65) Prior Publication Data

US 2020/0179740 A1    Jun. 11, 2020

(30) Foreign Application Priority Data

Dec. 10, 2018  (IT) .......................... 102018000010921

(51) Int. Cl.
  *A63B 21/00*    (2006.01)
  *A61H 1/02*    (2006.01)
  *A63B 22/06*    (2006.01)

(52) U.S. Cl.
  CPC ..... *A63B 21/00178* (2013.01); *A61H 1/0214* (2013.01); *A61H 1/0237* (2013.01); *A61H 1/0274* (2013.01); *A63B 22/06* (2013.01); *A61H 2201/1215* (2013.01); *A61H 2201/1253* (2013.01); *A61H 2201/1261* (2013.01); *A61H 2201/149* (2013.01);
  (Continued)

(58) Field of Classification Search
  CPC .......... A63B 21/00178; A63B 21/4045; A63B 22/20–203; A61H 1/0274; A61H 2201/1215; A61H 2205/06; A61H 1/0214; A61H 2201/0119; A61H 2201/149; A61H 2201/1463; A61H 2201/1635; A61H 2201/1669; A61H 1/00; A61H 1/001; A61H 1/02; A61H 1/0237; A61H 1/024; A61H 1/0266; A61H 1/0277–0285; A63G 23/00; A63G 31/00
  USPC .......................................................... 601/33
  See application file for complete search history.

(56) References Cited

U.S. PATENT DOCUMENTS 3,824,993 A * 7/1974 Grant ................... A61H 1/0214
                                                                601/36
4,621,620 A * 11/1986 Anderson ............ A61H 1/0262
                                                                482/901
(Continued)

FOREIGN PATENT DOCUMENTS

DE    4338155 A1    5/1995
EP    2865363 A1    4/2015
(Continued)

OTHER PUBLICATIONS

Italian Search Report dated Aug. 12, 2019.

*Primary Examiner* — Justine R Yu
*Assistant Examiner* — Benjamin M. Kusiak
(74) *Attorney, Agent, or Firm* — Thomas | Horstemeyer, LLP

(57) ABSTRACT

A translational-rotary machine is provided as a physical exercise machine particularly for the rehabilitation or training of upper and lower limbs for both passive and active therapies. The machine can perform movements that: allow a lower shaft to rotate while the carriage is stationary; allow the lower shaft to not rotate while the carriage translates in a direction of applied force; or allow a translational-rotary movement.

17 Claims, 14 Drawing Sheets

(52) U.S. Cl.
CPC ........... *A61H 2201/1436* (2013.01); *A61H 2201/1463* (2013.01); *A61H 2201/164* (2013.01); *A61H 2201/1635* (2013.01); *A61H 2201/1664* (2013.01); *A61H 2201/1671* (2013.01); *A61H 2205/06* (2013.01)

(56) References Cited

U.S. PATENT DOCUMENTS

| | | | | |
|---|---|---|---|---|
| 4,717,146 | A * | 1/1988 | Nohara | A63B 21/00178 601/36 |
| 4,900,013 | A * | 2/1990 | Rodgers, Jr. | A63B 69/06 482/72 |
| 5,279,531 | A * | 1/1994 | Jen-Huey | A63B 21/154 482/54 |
| 5,690,567 | A | 11/1997 | Denijs et al. | |
| 10,675,500 | B2 * | 6/2020 | Wang | A63B 23/03533 |
| 2004/0204293 | A1 * | 10/2004 | Andreasen | A61H 1/0262 482/52 |
| 2014/0243717 | A1 * | 8/2014 | Weydert | A61H 1/0266 601/34 |

FOREIGN PATENT DOCUMENTS

| | | |
|---|---|---|
| KR | 101537817 B1 | 7/2015 |
| WO | 2014092645 A1 | 6/2014 |

\* cited by examiner

TRANSLATIONAL-ROTARY MACHINE

CROSS-REFERENCE TO RELATED APPLICATIONS

This application claims priority to and the benefit of Italian application no. 102018000010921, filed Dec. 10, 2018, which is herein incorporated by reference in its entirety.

DESCRIPTION

The present invention relates to a translational-rotary machine, in particular adapted to be implemented in a physical exercise machine, and in particular for the rehabilitation or training of upper and lower limbs, and for passive and active therapies.

Rehabilitation therapy of the upper limbs is an extremely important clinical practice aimed at restoring the motor skills of a patient affected by paresis or hemiparesis of various etiologies and degrees, or suffering from orthopedic damage, for example.

There are various techniques which can be used for motor rehabilitation but one of the most effective is unquestionably the one which uses specific rehabilitation devices. Rehabilitation can be either passive or active. In passive rehabilitation (CPM, Continuous Passive Motion), the machine works on the limb, which is consequently induced to perform special functions, the purpose of which is to reconstitute a heavily compromised motility. Active rehabilitation, on the other hand, requires the direct effort of the patient's limb, while the mechanical aid follows the patient's movements opposing a resistance.

In any case, rehabilitation devices are generally cumbersome, expensive and structurally complex.

It would, therefore, be desirable to make available a physical exercise machine which is structurally less complex, of small dimensions and limited weight and which makes it possible to practice a passive or active therapy according to needs.

These and other objects are achieved by a machine for the physical exercise of limbs as disclosed in the appended claims, the definitions of which form an integral part of the present description.

Further features and advantages of the present invention will be more apparent from the description of preferred embodiments, given hereinafter by way of non-limiting example with reference to the following figures, in which.

Figure 1:
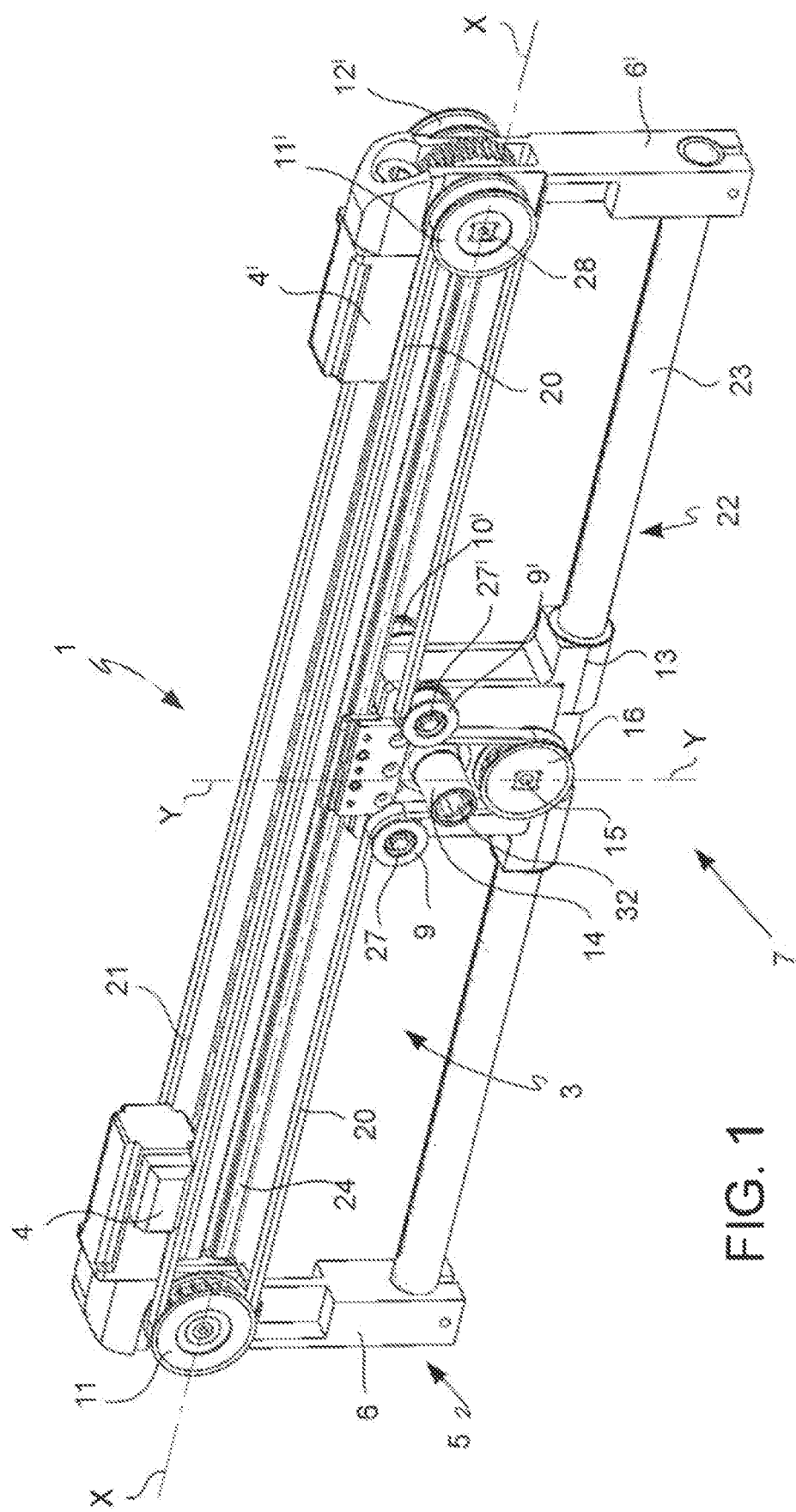
FIG. 1 is a perspective view of the physical exercise machine of the invention.
Figure 2:
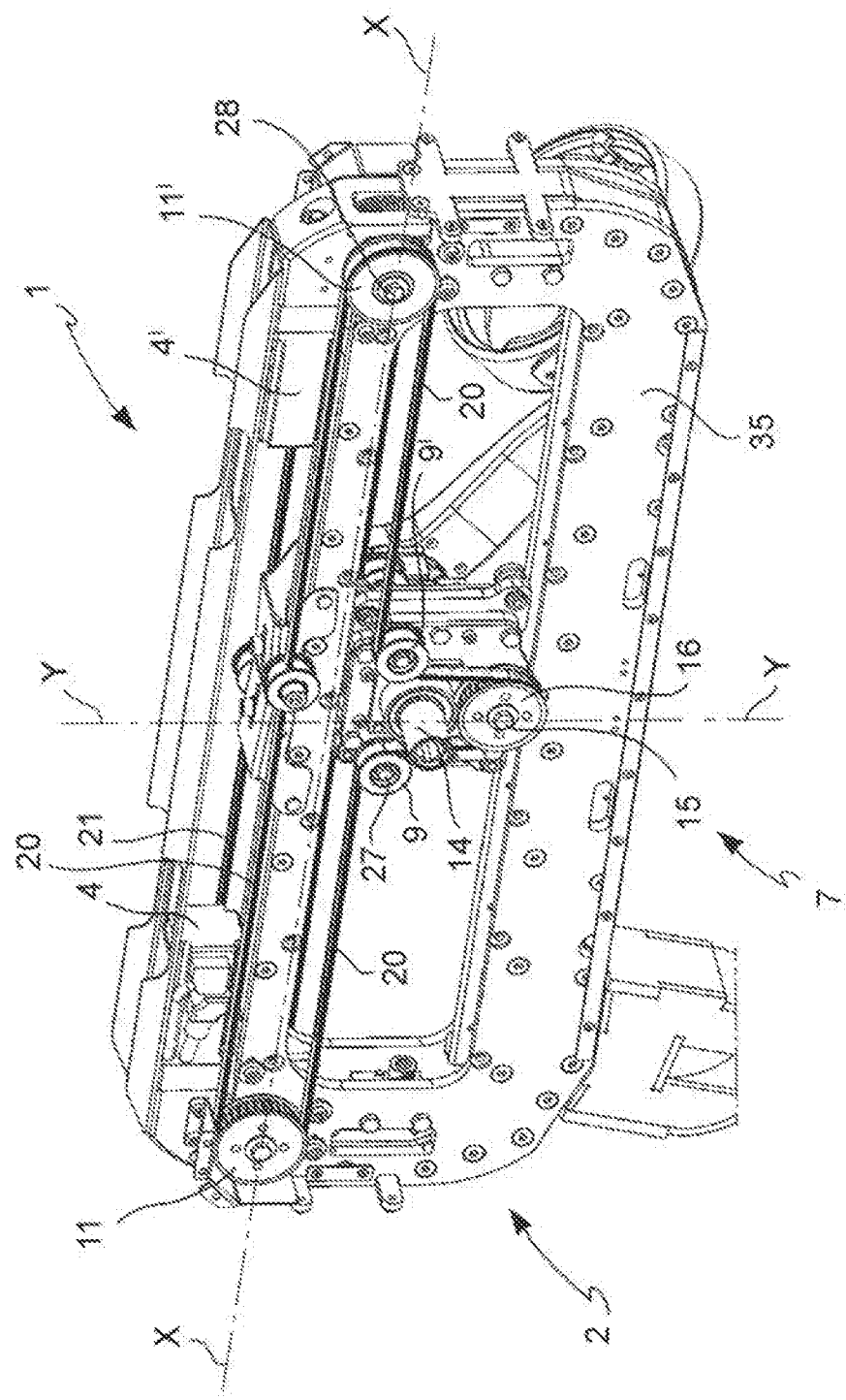
FIG. 2 is a perspective view of the machine in FIG. 1, according to a further embodiment.
Figure 3:
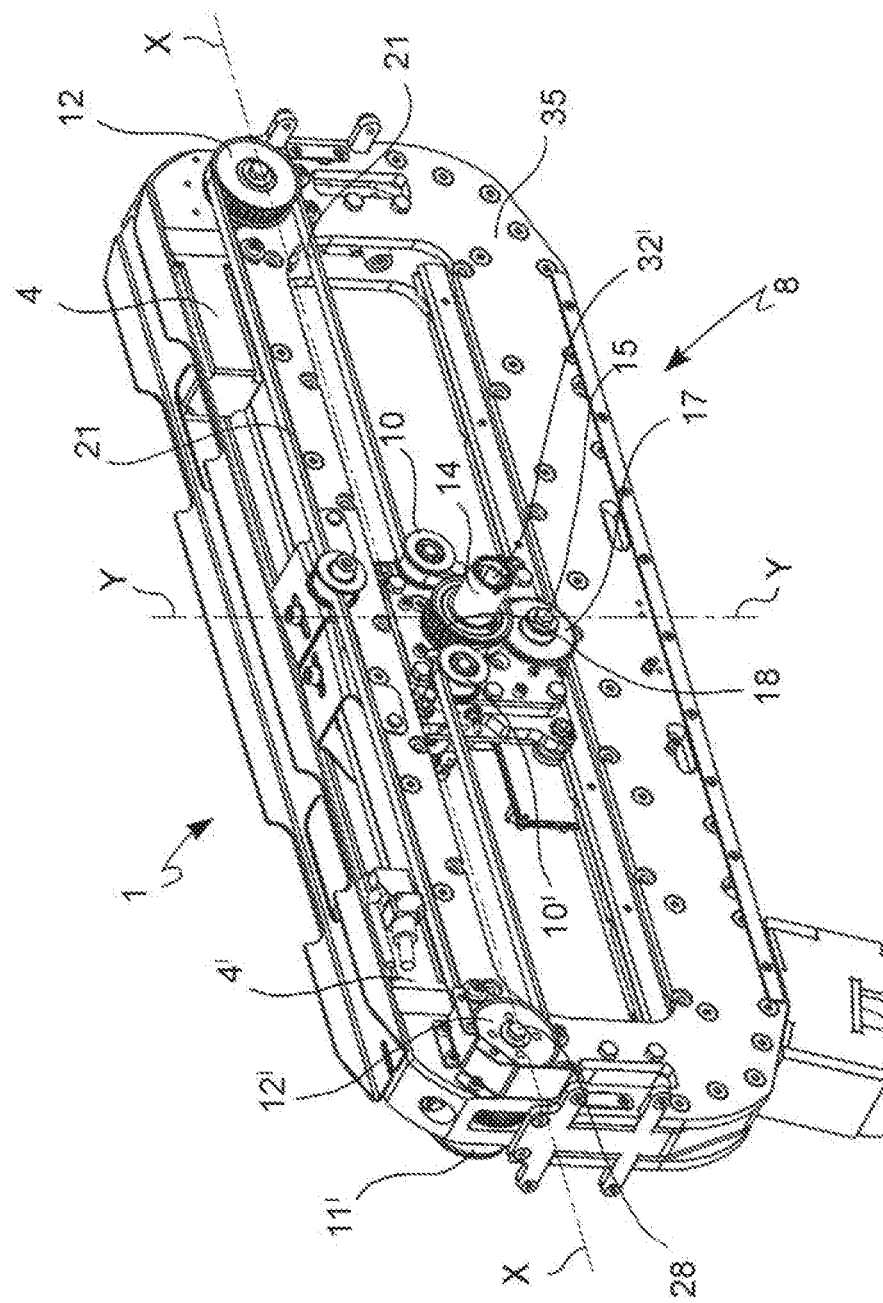
FIG. 3 is a perspective view of the machine in FIG. 2 seen from the opposite side.

With reference to the figures, the translational-rotary machine, indicated as a whole by reference numeral 1, comprises a frame on which the translational-rotary members 3 dedicated to the movement of a user's limb are mounted, said translational-rotary members 3 being operationally connected to motor means 4, 4' and operable in active or passive manner.

"Operable in passive manner" means that the translational-rotary members 3 are set in motion by the motor means 4, 4' to which they are connected, thereby transmitting the movement to the limb or limbs of the user of the machine.

On the other hand, the expression "operable in active manner" means that the translational-rotary members 3 have a predetermined resistance to the motion imposed by the user. Therefore, a situation in which the translational-rotary members 3 are operating in active manner will correspond to a so-called passive exercise on the user and vice versa.

The frame comprises a support structure 5 for the translational-rotary members 3, which develops along a longitudinal axis X, and two columns 6, 6' which extend perpendicularly to the axis X, as shown in FIG. 1.

Figure 9:
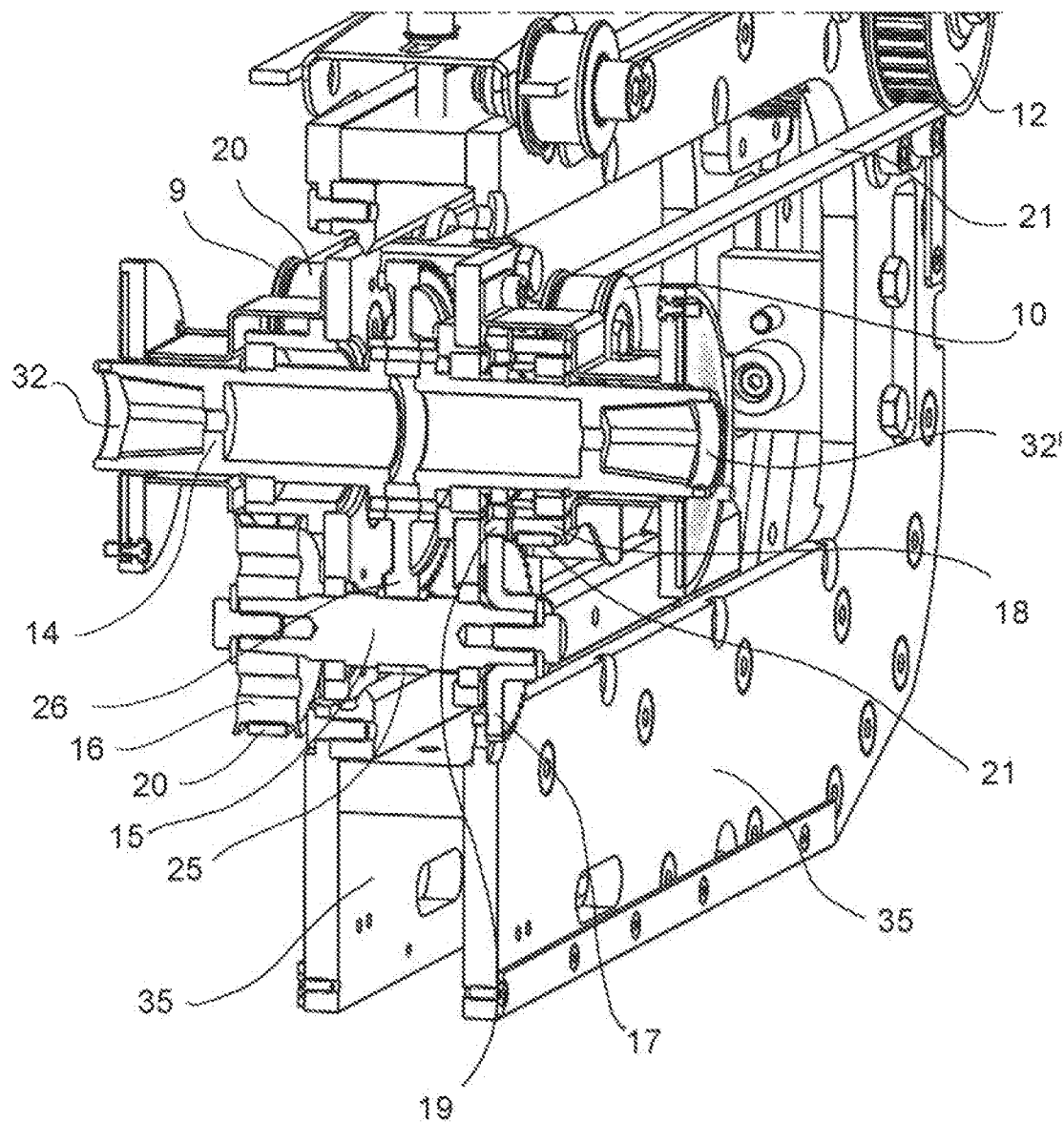
FIG. 9 is a perspective cross-section view of a detail of the machine in FIG. 2.

The translational-rotary members 3 comprise:

a first pair of pulleys 11, 11' arranged on a front side 7 of the machine 1, at the ends of the support structure 5, the pulleys 11, 11' of said first pair being arranged along an axis which is substantially parallel to the axis X;

a second pair of pulleys 12, 12' arranged on a rear side 8 of the machine 1, at the ends of the support structure 5, the pulleys 12, 12' of said second pair being arranged along an axis which is substantially parallel to the axis X;

a carriage 13 which is movable along the axis X, wherein said carriage 13 defines a symmetry axis Y of the carriage, said axis Y being arranged vertically and perpendicular to the axis X;

wherein said carriage 13 comprises:

a first pair of tension pulleys 9, 9' arranged on said carriage 13, on the front side 7 of the machine 1, the tension pulleys 9, 9' of said first pair being aligned along an axis which is substantially parallel to axis X;

a second pair of tension pulleys 10, 10' arranged on said carriage 13, on the rear side 8 of the machine 1, the tension pulleys 10, 10' of said second pair being aligned along an axis which is substantially parallel to the axis X;

an upper shaft 14 passing through the carriage 13, substantially incident with axis Y and transverse to axes X and Y;

a lower shaft 15 passing through the carriage 13, arranged substantially incident with axis Y and transverse to axes X and Y and aligned vertically with the upper shaft 14;

a first return pulley 16 integrally keyed onto the lower shaft 15 on the front side 7 of the machine 1;

a first toothed wheel 17 integrally keyed onto the lower shaft 15 on the rear side 8 of the machine 1;

a second return pulley 18 idly mounted onto the upper shaft 14 on the rear side 8 of the machine 1;

a second toothed wheel 19 idly mounted onto the upper shaft 14 on the rear side 8 of the machine 1 (FIG. 9), said second toothed wheel 19 being integral with the second return pulley 18;

a first transmission member 20 which operatively connects said first pair of pulleys 11, 11', first pair of tension pulleys 9, 9' and first return pulley 16;

a second transmission member 21 which operatively connects said second pair of pulleys 12, 12', second pair of tension pulleys 10, 10' and second return pulley 18;

and wherein the first toothed wheel 17 is operatively meshed with the second toothed wheel 19.

According to an embodiment, a respective pulley 11', 12 of each of said first 11, 11' and second 12, 12' pairs of pulleys is operatively connected to the respective motor means 4, 4' by means of gear motors. For example, a helical screw gear motor system, which will be described in greater detail below, may be advantageously used.

The remaining two pulleys 11, 12' are mounted idle.

Preferably, but in non-limiting manner, the pulleys 11', 12' connected to the motor means 4, 4' are arranged symmetrically on the support structure 5, i.e. if pulley 11', directly connected to the respective motor means 4', is arranged at one end of the support structure 5 (and therefore of a column 6) in the first pair of pulleys, pulley 12, arranged on the other end of the support structure 5 (and therefore on the column 6') will be connected to the respective motor means 4' in the second pair of pulleys, or vice versa.

In the embodiment shown in the figures, in which both motor means 4, 4' are placed above the support structure 5, the pulley 11' of the first pair of pulleys is connected, e.g. by means of a worm screw-helical cylindrical wheel coupling to the first motor means 4, while the pulley 12 of the second pair of pulleys is connected to second motor means 4'. Alternatively, the pulley 11' of the first pair of pulleys is connected to the first motor means 4', while the pulley 12' of the second pair of pulleys is connected to the second motor means 4'.

Furthermore, in the embodiment shown in the figures, the driving pulley 11' and the idler pulley 12' are keyed onto the same shaft, and the driving pulley 12 and the idler pulley 11 are keyed onto a further same shaft. In this embodiment, the idler pulleys 11, 12' are keyed onto respective shafts by means of bearings so as to release said idler pulleys 11, 12' from the rotation of the driving pulleys 11', 12 which are instead integrally keyed onto the respective shafts.

Figure 7:
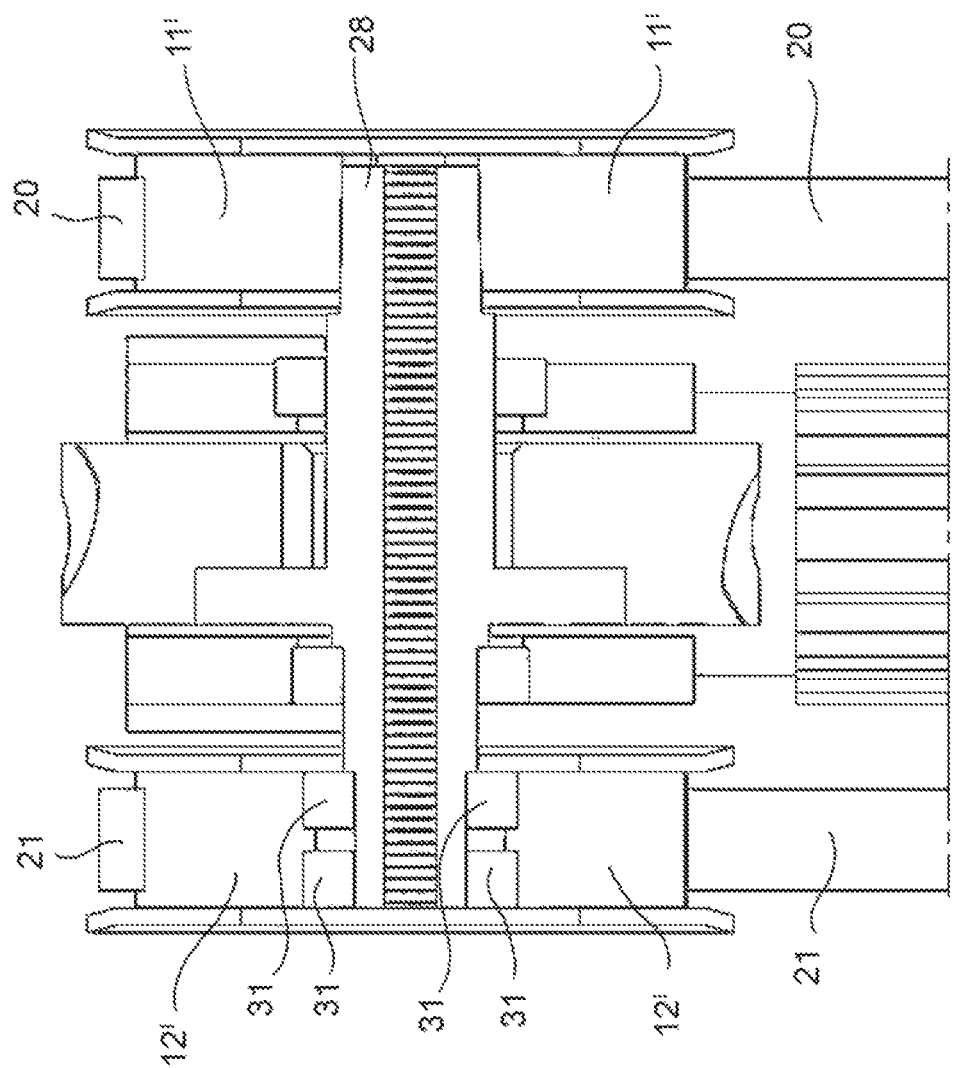
FIG. 7 is a longitudinal section view of a detail of the machine in FIG. 1.
Figure 8:
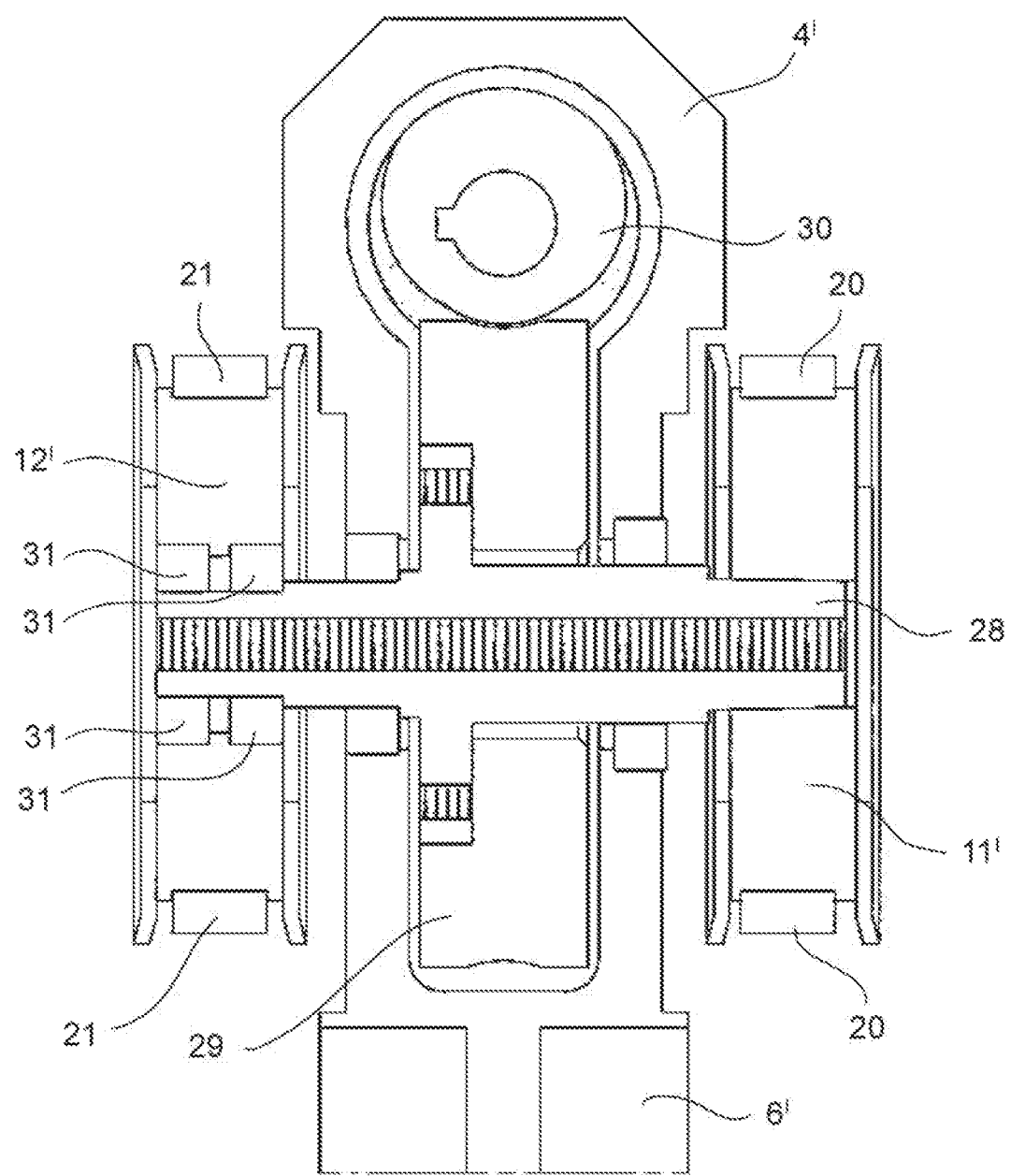
FIG. 8 is a cross-section view of the detail in FIG. 7.

FIGS. 7 and 8 show a detail of the system for transmitting motion from the motor means 4' to the pulley 11' of the first pair of pulleys, but a similar transmission system is also used for the pulley 12 of the second pair of pulleys.

The pulley 11' is integrally mounted onto a first drive shaft 28', while the idler pulley 12' is mounted onto the first drive shaft 28' by means of bearings 31, so as to release the rotation of the idler pulley 12' from the rotation of the first drive shaft 28'.

Figure 4:
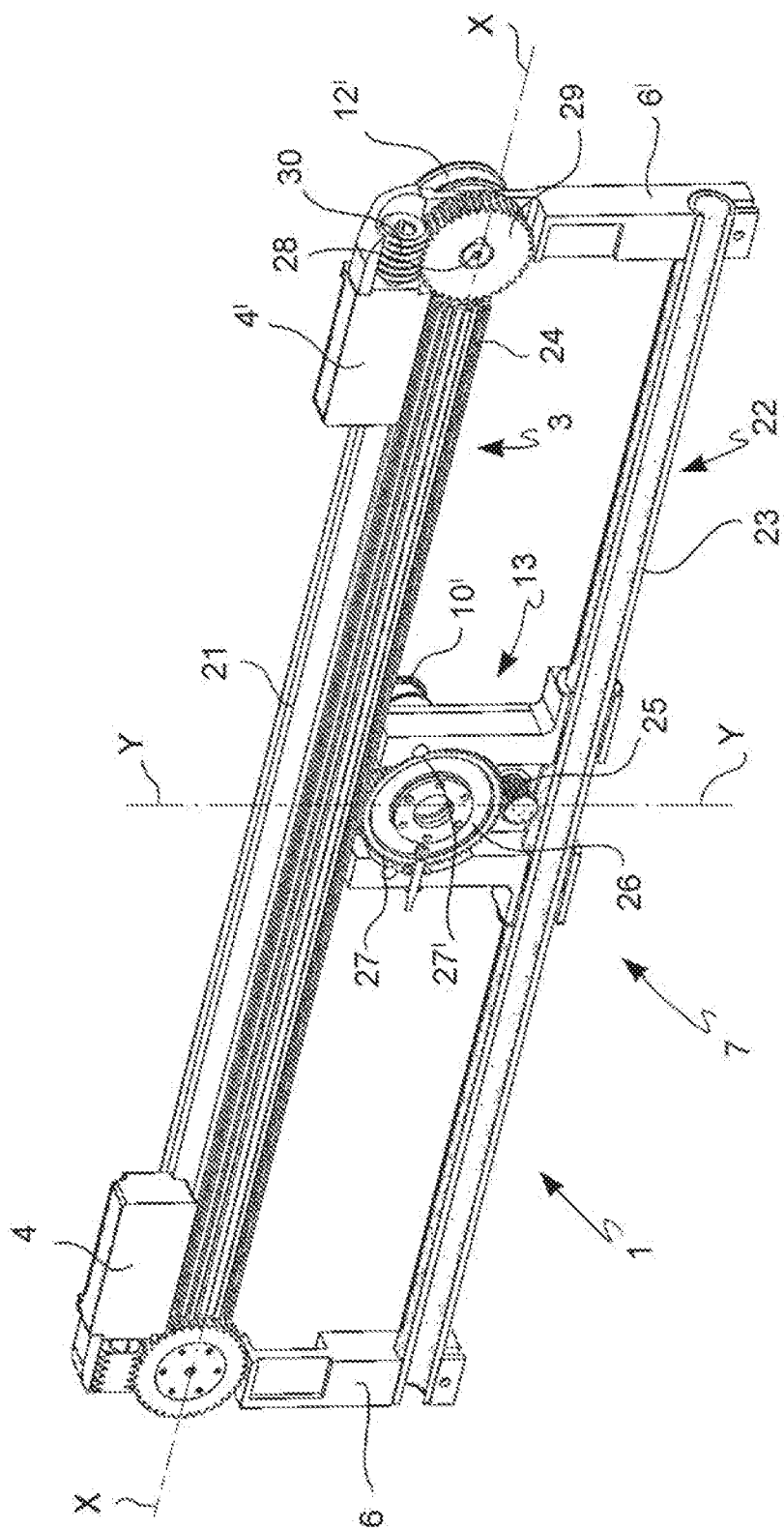
FIG. 4 is a longitudinal section view of the machine in FIG. 1.
Figure 5:
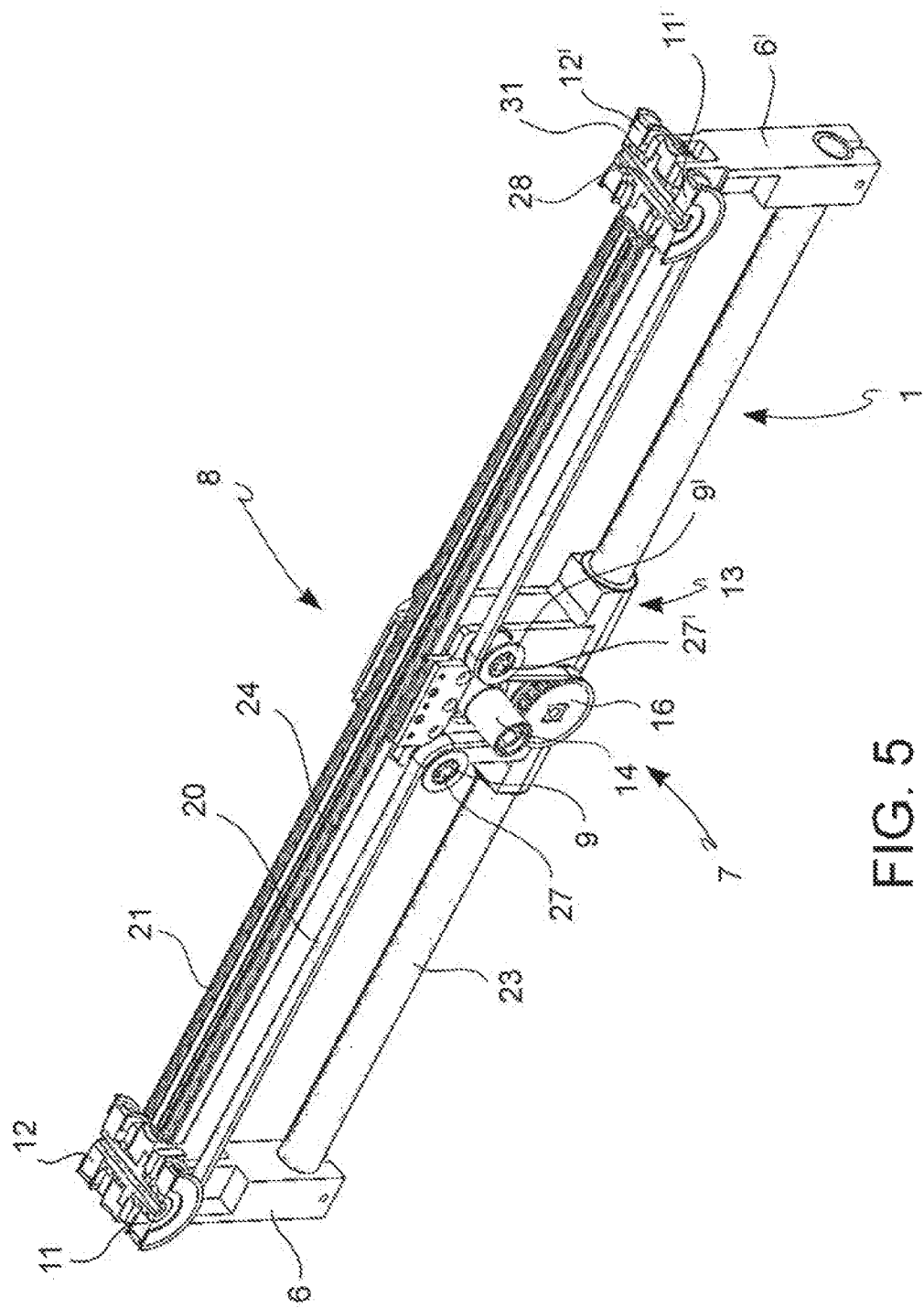
FIG. 5 is a cross-section view of the machine in FIG. 1.
Figure 6:
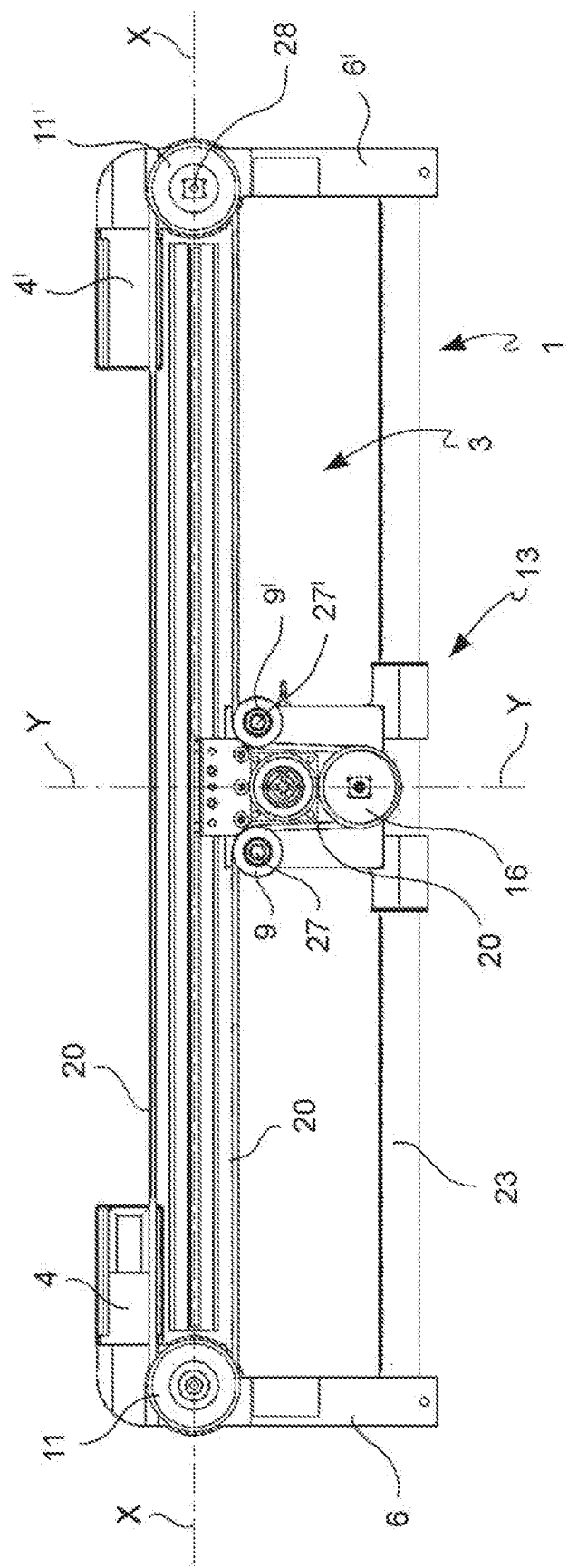
FIG. 6 is a front view of the machine in FIG. 1.

A first helical wheel 29 is keyed integrally to the first drive shaft 28, preferably at the centerline of the first drive shaft 28 (FIG. 4).

The first helical wheel 29 meshes with a first worm screw 30 which receives the motion from the motor means 4'.

As mentioned above, a similar transmission system is implemented for the movement of the driving pulley 12 and the decoupling the idler pulley 11 from the rotation of the driving pulley 12.

The carriage 13 is slidable on a track 22 placed on a vertical plane and along the axis X. The track 22 comprises a lower rail 23 and an upper rail 24. In the embodiment in the figures, the lower track 23 has a tubular shape, while the upper track 24 has a rectangular section, but nothing prevents reversing them or using sections of different shapes.

The carriage 13 is therefore equipped with a first sliding seat for the lower track 23 and a second sliding seat for the upper track 24. In the embodiment in the figures, the first sliding seat has, in turn, tubular shape with positive coupling with the lower track 23.

The first and second pair of tension pulleys 9, 9' and 10, 10' are mounted on the carriage 13. The tension pulleys 9, 9' and 10, 10' are not motorized.

The pulleys 9, 10 and the pulleys 9', 10' are keyed onto the ends of the respective shafts 27, 27'. The shafts 27, 27' cross the carriage 13 in a transversal direction to the plane of axes X-Y.

According to an embodiment, a toothing 25 is formed on the lower shaft 15, at the centerline of the lower shaft 15.

A toothed reduction wheel 26 is integrally keyed onto the upper shaft 14, at the centerline of the upper shaft 14, so as to mesh with the toothing 25 on the lower shaft 15 (FIG. 4).

Preferably, the toothing 25 and the toothed reduction wheel 26 have different diameters from each other so as to form a motion reduction system.

According to a preferred embodiment, the toothed reduction wheel 26 has a greater diameter than the toothing 25 so as to reduce the rotation speed of the upper shaft 14 with respect to the rotation speed of the lower shaft 15.

In other embodiments, the upper 14 and lower 15 shafts are connected by flexible transmission means, such as a chain or belt.

The first 20 and second 21 transmission members consist of a double-toothed drive belt, a chain, a flexible drive or the like.

On the front side 7 of the machine 1, the first transmission member 20 winds in the order:

about the pulley 11' of the first pair of pulleys 11, 11',
about the pulley 9 of the first pair of tension pulleys 9, 9',
about the first return pulley 16,
about the pulley 9 of the first pair of tension pulleys 9, 9', and finally
about the pulley 11 of the first pair, Therefore, the lower shaft 15 receives the motion from the first return pulley 16 on the front side 7, the force transmitted by the transmission member 20 acting on the lower section of the return pulley 16.

On the rear side 8 of the machine 1, the second transmission member 21 winds in the order:

about the pulley 12 of the second pair of pulleys 12, 12',
about the pulley 10 of the second pair of tension pulleys 10, 10',
about the second return pulley 18,
about the pulley 10' of the second pair of tension pulleys 10, 10', and finally
about the pulley 12' of the second pair.

Therefore, the lower shaft 15 receives the motion on the rear side 8 from the second toothed wheel 19, which is integral with the second return pulley 18, the force transmitted by the transmission member 21 acting on the upper section of the first toothed wheel 17.

In this manner, the following movements of the machine which is the object of the invention can be performed:

a) when the motor means 4, 4' actuate the driving pulleys 11', 12 so that they have a concordant angular speed (both rotating clockwise and counterclockwise, in which the observation point for the first driving pulley 11' is the front side 7, while the observation point for the second driving pulley 12 is the rear side 8) and equal modulus, the first return pulley 16 and the first toothed wheel 17 are subjected to equal forces in opposite direction, thereby the lower shaft 15 rotates but the carriage 13 is stationary;

b) when the motor means 4, 4' have discordant angular speed (one turning clockwise and the other counterclockwise, or vice versa) and equal modulus, the first return pulley 16 and the first toothed wheel 17, which are integral, are subjected to equal forces in equal direction, whereby the lower shaft 15 does not rotate (because such forces are applied to opposite lower and upper ends of the pulley) and the carriage 13 translates in the direction of the applied force;

c) when the motor means 4, 4' have either concordant or discordant angular speed but different modulus, there is a translational-rotary movement resulting from the combination of the movements described in points a) and b).

It is worth noting that the upper shaft 14, which meshes with the lower shaft 15 by means of the reduction toothed wheel 26 and the toothing 25 respectively, is rotated only in conditions a) and c) described above.

The translation of the carriage 13 along the axis X in one direction or in the other is therefore obtained either with different angular speeds of the motor means 4, 4' and/or by reversing the direction of rotation thereof.

In this manner, therefore, the user may be subject to passive physical activity, particularly indicated in the case of rehabilitative therapies.

According to an embodiment, shaped seats 32, 32' adapted to insert and connect various types of tools to the machine 1 are formed at the ends of the upper shaft 14.

Figure 10:
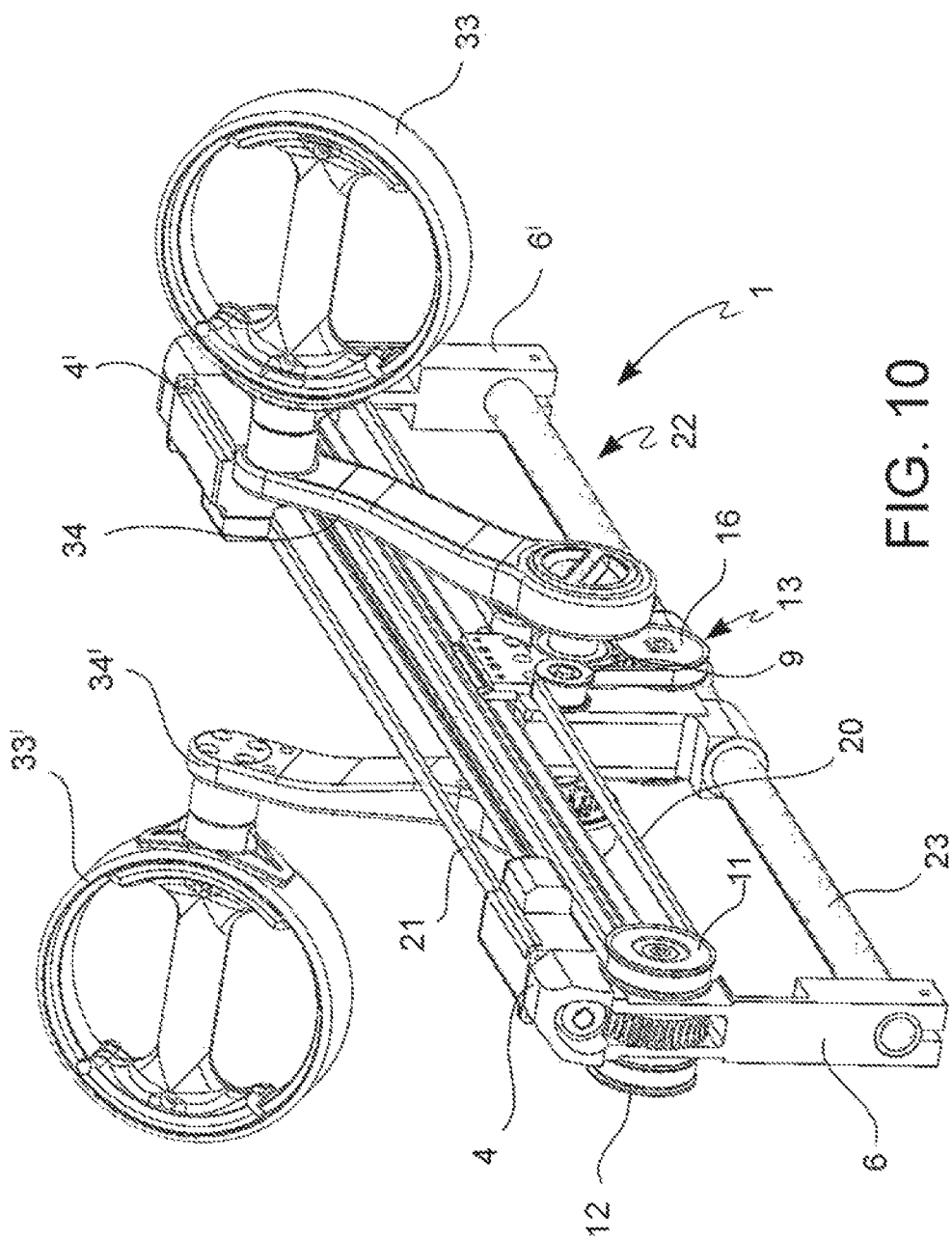
FIG. 10 is a perspective view of the machine of the invention of the machine in FIG. 1, with accessories installed.
Figure 11A:
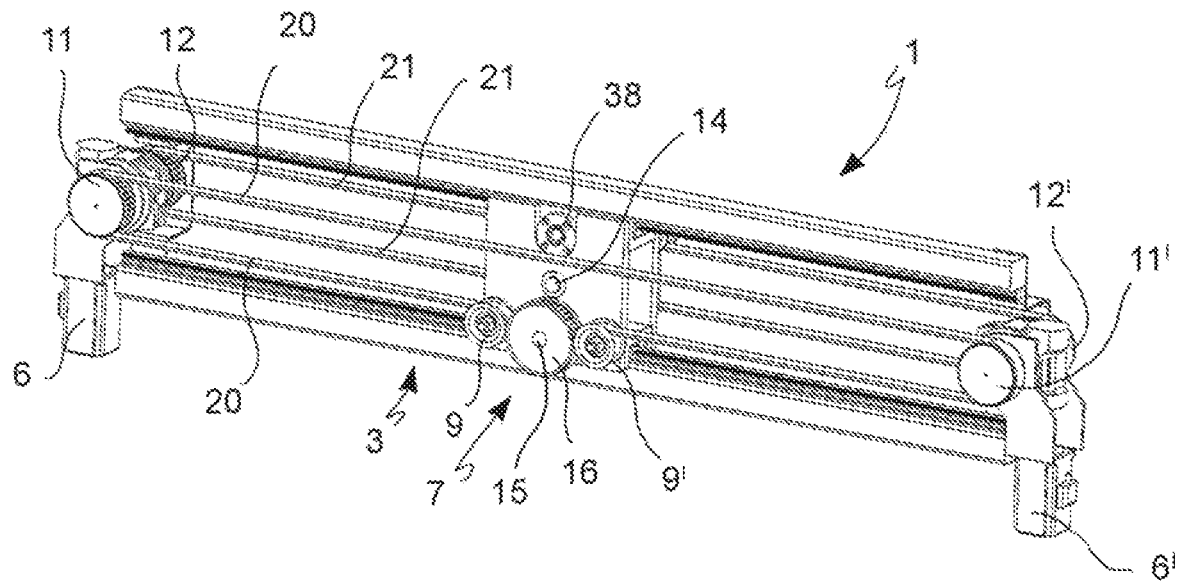
FIG. 11A is a perspective view of the machine of the invention according to a further embodiment.
Figure 11B:
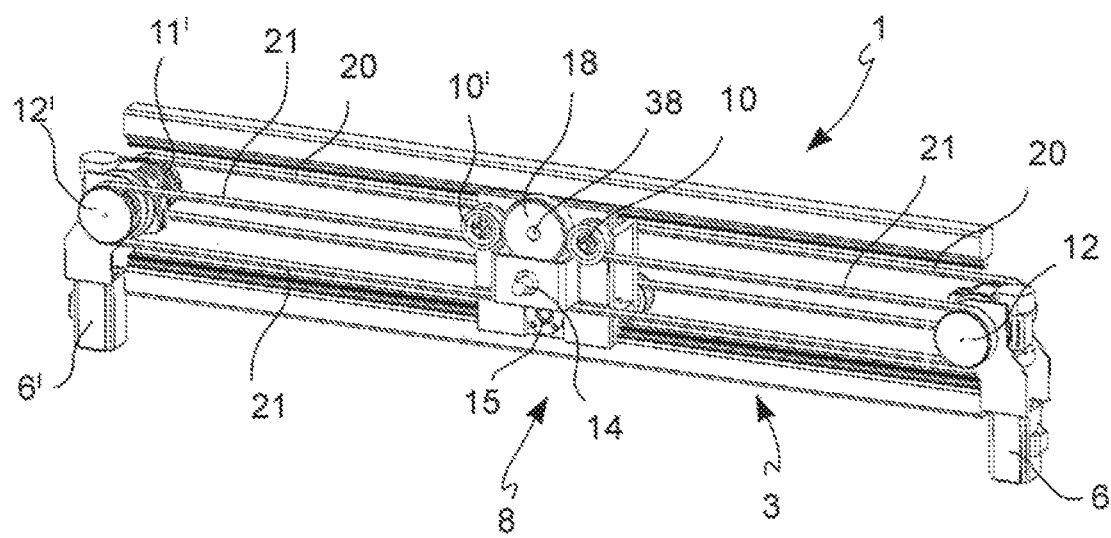
FIG. 11B is a perspective view of the machine in FIG. 11A seen from the opposite side.
Figure 11C:
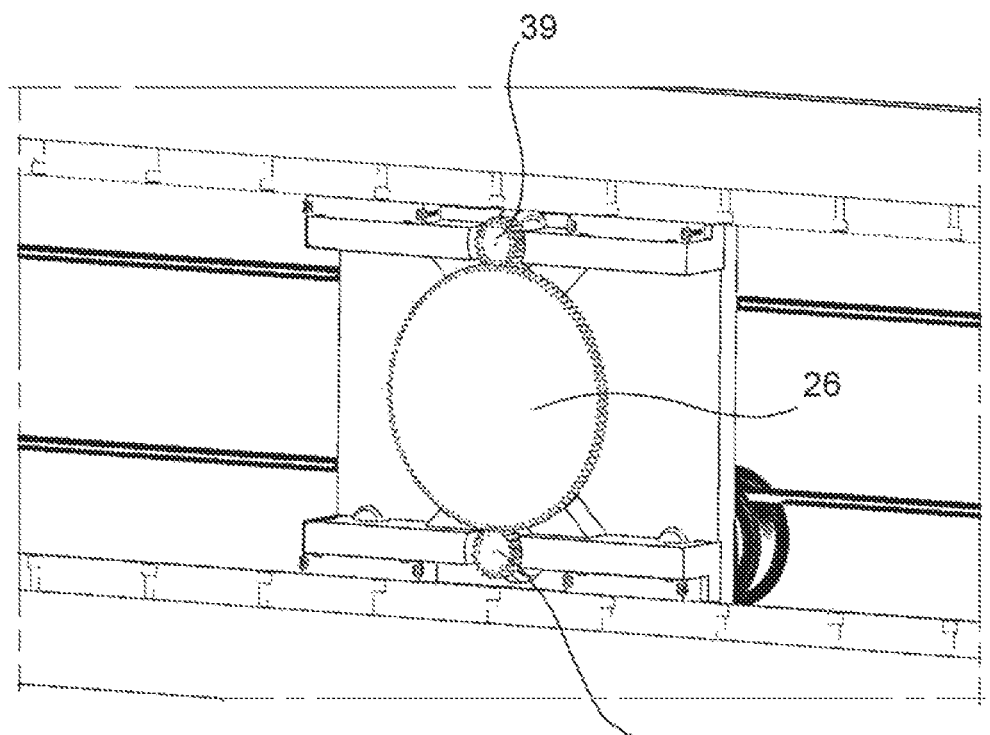
FIG. 11C is a perspective longitudinal section view of the machine in FIG. 11A.
Figure 11D:
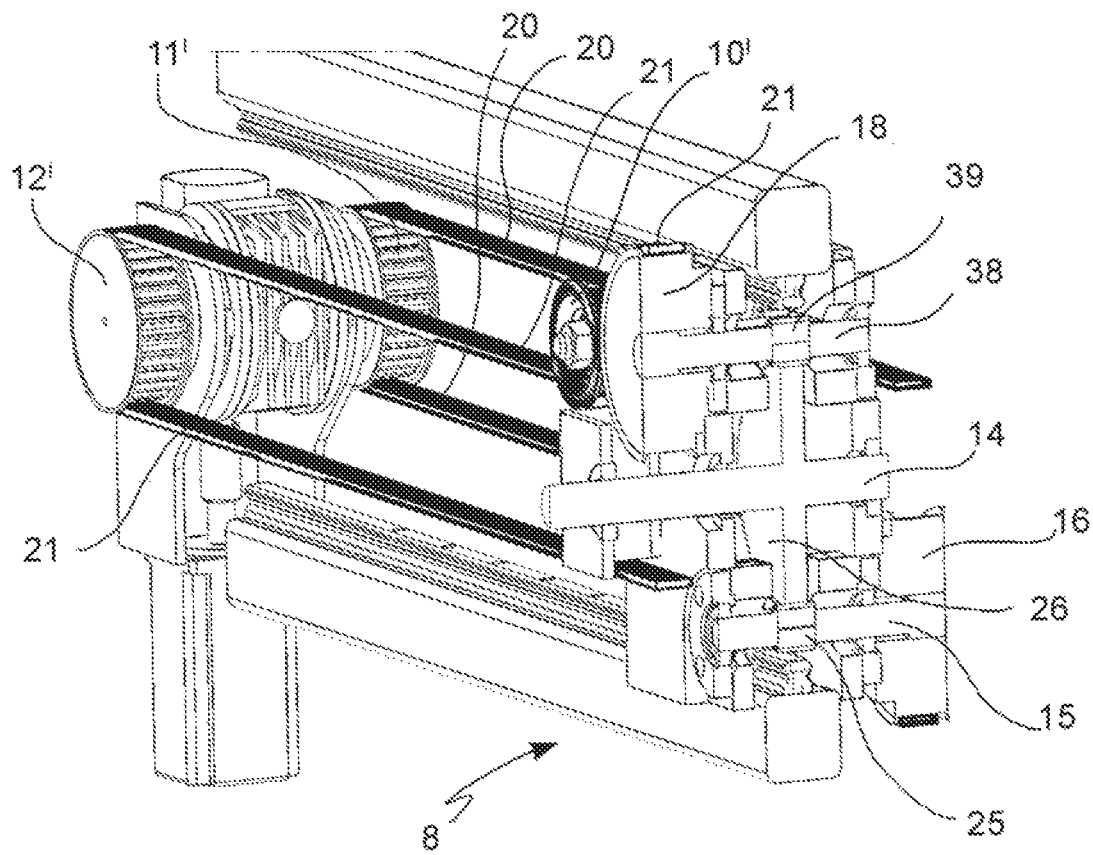
FIG. 11D is a perspective cross-section view of the machine in FIG. 11A.
Figure 12A:
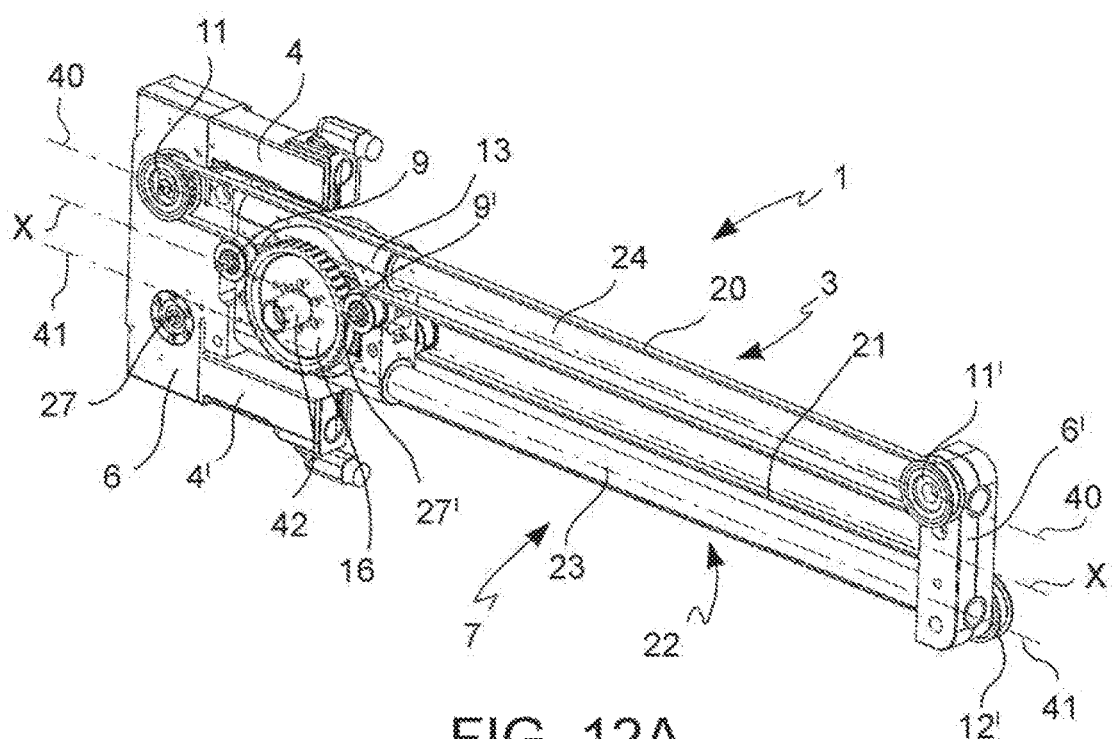
FIG. 12A is a perspective view of the machine of the invention according to a further embodiment of the invention.
Figure 12B:
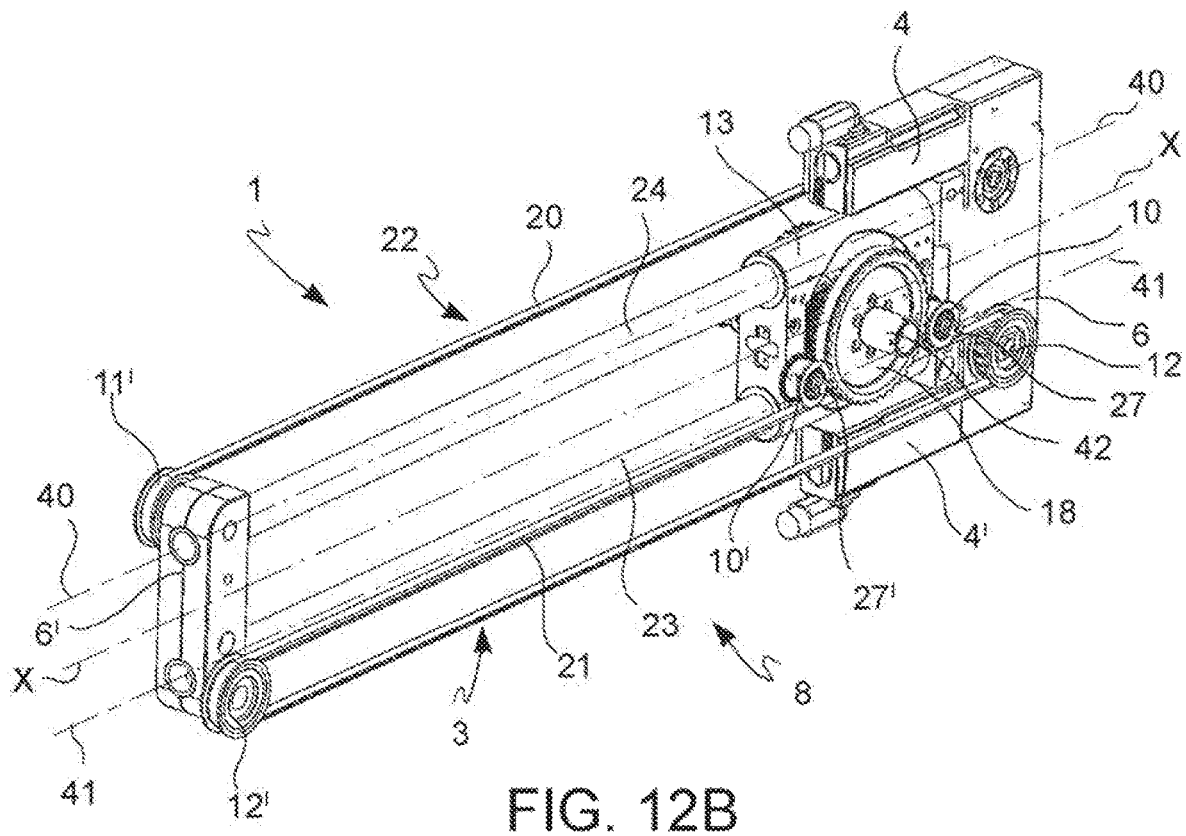
FIG. 12B is a perspective view of the machine in FIG. 12A seen from the opposite side.
Figure 12C:
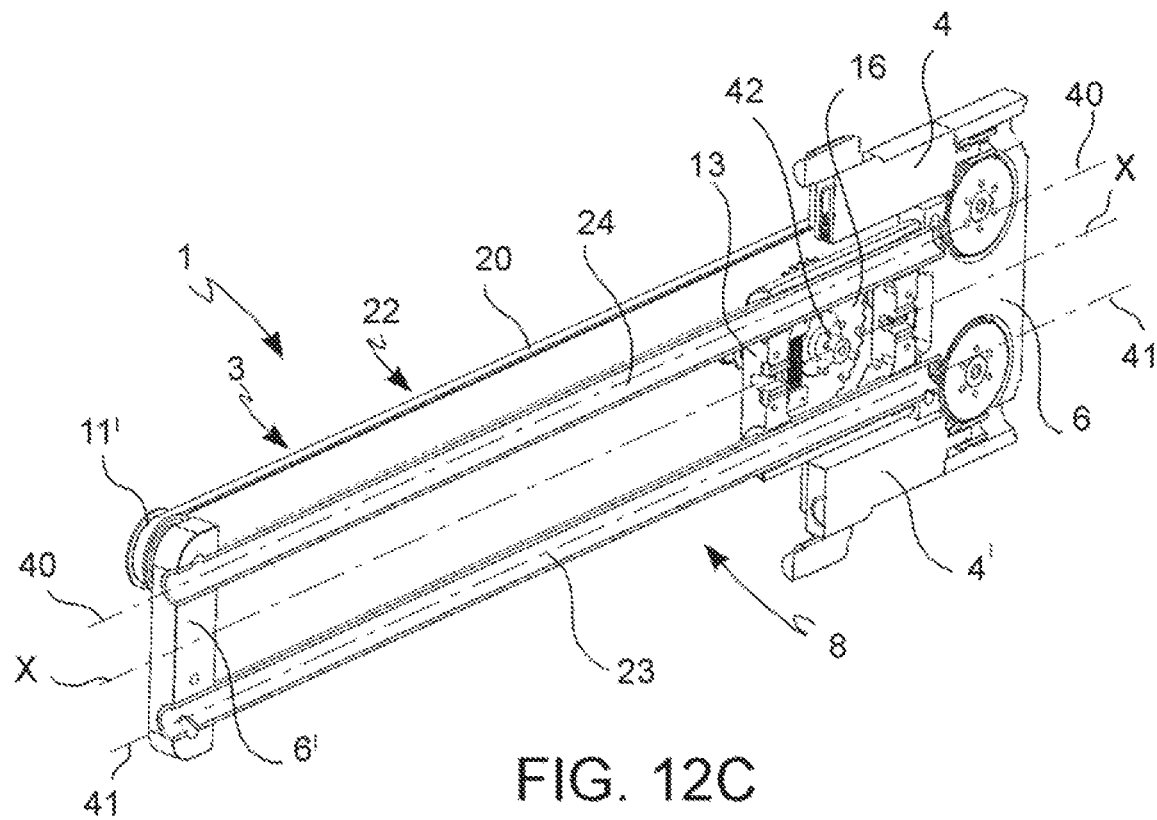
FIG. 12C is a perspective longitudinal section view of the machine in FIG. 12A.
Figure 12D:
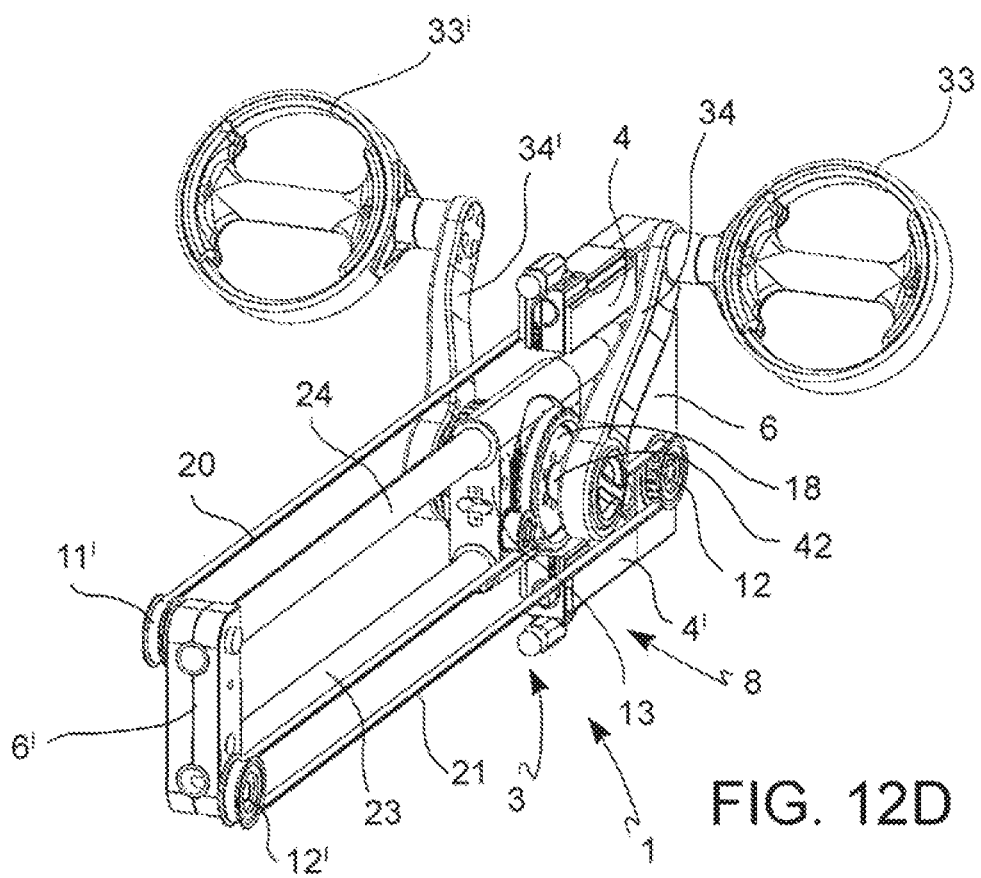
FIG. 12D is a perspective view of the machine in FIG. 12A, with accessories installed.

FIG. 10 shows the application of a pair of handles 33, 33' connected to the upper shaft 14 by means of relative cranks 34, 34'. This application allows the user to rotate the handles 33, 33' both actively and passively.

The motor means can also be operated so as to rotate the cranks 34, 34' with reciprocating tilting movement of the upper shaft 14, combined with a translation of the carriage 13 (according to the laws of motion described above), so as to exercise the limb(s) of a user. This type of exercise is particularly suited for rehabilitation therapies, mainly orthopedic.

It is also possible to replace the handles 33, 33' with knobs suited to allow a rowing motion for the arms of a user and therefore can be achieved by a law of motion according to type b) above described.

According to an embodiment, the machine 1 may comprise a supporting scaffolding 35.

According to a further embodiment of the invention (FIGS. 11A, 11B, 11C and 11D), the translational-rotary members 3 comprise a second upper shaft 38 passing through the carriage 13, vertically aligned with the lower shaft 15 and with the upper shaft 14, and arranged above the lower shaft 15 and the upper shaft 14.

According to this embodiment, the second return pulley 18 is integrally keyed onto the second upper shaft 38 on the rear side 8 of the machine 1.

A second toothing 39 is formed on the second upper shaft 38, at the centerline of the upper shaft 38, so as to mesh with the reduction gear 26 keyed onto the upper shaft 14.

Therefore, according to this embodiment, the reduction toothed wheel 26 simultaneously meshes in lower section thereof with the toothing 25, and in its upper section thereof with the second toothing 39.

According to this embodiment, the first transmission member 20, arranged on the front side 7 of machine 1, operationally connects the motor means 4, 4' to the first idler pulley 16, while the second transmission member 21, arranged on the rear side 8 of machine 1, operationally connects the motor means 4, 4' to the second idler pulley 18.

Therefore, the first idler pulley 16, the reduction toothed wheel 26 and the second idler pulley 18 are operationally connected to one another, so that the force transmitted by the first idler pulley 20 acts on the lower section of the first idler pulley 16, and the force transmitted by the second idler pulley 21 acts on the upper section of the second idler pulley 18.

In this manner, it is possible to perform the movements a), b) and c) of machine 1 described above and not repeated here for the sake of brevity.

According to another embodiment of the invention (FIGS. 11A, 11B, 11C and 11D), on the front side 7 of the machine 1, the first transmission member 20 is wound, in order:
about the pulley 11' of the first pair of pulleys 11, 11',
about the pulley 9 of the first pair of tension pulleys 9, 9',
about the first return pulley 16,
about the pulley 9 of the first pair of tension pulleys 9, 9', and finally
about the pulley 11 of the first pair, Therefore, the lower shaft 15 receives the motion from the first return pulley 16 on the front side 7, the force transmitted by the transmission member 20 acting on the lower section of the return pulley 16.

On the rear side 8 of the machine 1, the second transmission member 21 winds in the order:
about the pulley 12 of the second pair of pulleys 12, 12',
about the pulley 10 of the second pair of tension pulleys 10, 10',
about the second return pulley 18,
about the pulley 10' of the second pair of tension pulleys 10, 10',
and finally
about the pulley 12' of the second pair.

Therefore, the second upper shaft 38 receives the motion from the second return pulley 18 on the front side 8, the force transmitted by the transmission member 21 acting on the upper section of the second return pulley 18.

Therefore, the first idler pulley 16 transmits a force to the reduction toothed wheel 26 which acts on the lower section of the reduction toothed wheel 26, through the lower shaft 15 and the toothing 25, while the second idler pulley 18 transmits a force to the reduction toothed wheel 26 which acts on the upper section of the reduction toothed wheel 26, through the second upper shaft 38 and the second toothing 39.

In this manner, it is possible to perform the movements a), b) and c) of machine 1 described above and not repeated here for the sake of brevity.

According to a further embodiment of the invention (FIGS. 12A, 12B, 12C and 12D), the translational-rotary members 3 comprises a middle shaft 42 passing through the carriage 13.

According to this embodiment, the first idler pulley 16 and the second idler pulley 18 are integrally keyed to the middle shaft 42, on the front side 7 and on the rear side 8 of the machine 1, respectively.

According to this embodiment, the first transmission member (20), arranged on the front side (7) of the machine (1), operationally connects the motor means (4, 4') to the first return pulley (16), while the second transmission member (21), arranged on the rear side (8) of the machine (1), operationally connects the motor means (4, 4') to the second return pulley (18).

The force transmitted by the first transmission member (20) acts on the lower section of the first return pulley (16) and the force transmitted by the second transmission member (21) acts on the upper section of the second return pulley (18).

In this manner, it is possible to perform the movements a), b) and c) of machine 1 described above and not repeated here for the sake of brevity.

Advantageously, the motor means 4, 4' are arranged on one side of the machine 1, at one of the columns 6, 6'. This results in an advantageous reduction in the overall dimensions of machine 1.

According to a further embodiment (FIGS. 12A, 12B, 12C, 12D), the upper track 24 defines an upper axis 40 parallel to axis X, and the lower track 23 defines a lower axis 41 parallel to axis X, and the first pair of pulleys 11, 11' is arranged on the front side 7 of the machine 1, along the upper axis 24, while the second pair of pulleys 12, 12' is arranged on the rear side 8 of the machine 1, along the lower axis 23.

According to an advantageous embodiment, motor 4' is connected to driving pulley 12', while pulley 12' is idle, and motor 4' is connected to driving pulley 11, while pulley 11' is idle.

According to this embodiment, on the front side 7 of the machine 1, the first transmission member 20 winds in the order:
  about the pulley 11' of the first pair of pulleys 11, 11',
  about the pulley 9 of the first pair of tension pulleys 9, 9',
  about the first return pulley 16,
  about the pulley 9 of the first pair of tension pulleys 9, 9', and finally
  about the pulley 11 of the first pair.

Therefore, the central shaft 42 receives the motion from the first return pulley 16 on the front side 7, the force transmitted by the transmission member 20 acting on the lower section of the return pulley 16.

On the rear side 8 of the machine 1, the second transmission member 21 winds in the order:
  about the pulley 12 of the second pair of pulleys 12, 12',
  about the pulley 10 of the second pair of tension pulleys 10, 10',
  about the second return pulley 18,
  about the pulley 10' of the second pair of tension pulleys 10, 10', and finally
  about the pulley 12' of the second pair.

Therefore, the central shaft 42 receives the motion from the second return pulley 18 on the front side 8, the force transmitted by the transmission member 21 acting on the upper section of the second return pulley 18.

In this manner, it is possible to perform the movements a), b) and c) of machine 1 described above and not repeated here for the sake of brevity.

It is apparent that only a particular embodiment of the translational-rotary machine which is the object of the present invention has been described, to which a person skilled in the art will be able to make all the changes necessary to adapt it to particular conditions, such as, for example, an industrial application or in a standard production system, without because of this departing from the scope of protection of the present invention.

The invention claimed is:

1. A translational-rotary machine (1) comprising a first and second motor means (4, 4') and translational-rotary members (3), wherein the translational-rotary members (3) comprise:
   a movable carriage (13);
   a lower shaft (15) passing through the carriage (13);
   a first return pulley (16) integrally keyed onto the lower shaft (15) on a front side (7) of the translational-rotary machine (1);
   a first toothed wheel (17) integrally keyed onto the lower shaft (15) on a rear side (8) of the translational-rotary machine (1);
   an upper shaft (14) passing through the carriage (13), said upper shaft (14) being vertically aligned with the lower shaft (15);
   a second return pulley (18) idly mounted onto the upper shaft (14) on the rear side (8) of the translational-rotary machine (1);
   a first transmission member (20) arranged on the front side (7) of the translational-rotary machine (1), said first transmission member (20) being adapted to operatively connect the first and second motor means (4, 4') to the first return pulley (16);
   a second transmission member (21) arranged on the rear side (8) of the translational-rotary machine (1), said second transmission member (21) being adapted to operatively connect the first and second motor means (4, 4') to the second return pulley (18);
   wherein the second return pulley (18) is operatively connected to the first toothed wheel (17) by means of a second toothed wheel (19), so that the force transmitted by the second transmission member (21) acts on an upper section of the first toothed wheel (17),
   and wherein the force transmitted by the first transmission member (20) acts on a lower section of the first return pulley (16);
   a frame (2) on which translational-rotary members (3) are mounted, which are configured to move limbs of the user, said translational-rotary members (3) being operatively connected to the first and second motor means (4, 4'), wherein the frame (2) comprises a support structure (5) for the translational-rotary members (3), which extends along a longitudinal axis X,
   wherein the translational-rotary members (3) comprise:
   a first pair of pulleys (11, 11') arranged on the front side (7) of the translational-rotary machine (1), at the ends of the support structure (5), the pulleys (11, 11') of said first pair being aligned along an axis which is substantially parallel to the axis X;
   a second pair of pulleys (12, 12') arranged on the rear side (8) of the translational-rotary machine (1), at the ends of the support structure (5), the pulleys (12, 12') of said second pair being aligned along an axis which is substantially parallel to the axis X;
   the carriage (13) which is movable along the axis X, wherein said carriage (13) has a symmetry axis Y of the carriage which is perpendicular to the axis X;
   wherein said carriage (13) comprises:
   a first pair of tension pulleys (9, 9') arranged on said carriage (13), on the front side (7) of the translational-rotary machine (1), the tension pulleys (9, 9') of said first pair being arranged along an axis which is substantially parallel to the axis X;
a second pair of tension pulleys (10, 10') arranged on said carriage (13), on the rear side (8) of the translational-rotary machine (1), the tension pulleys (10, 10') of said second pair being arranged along an axis which is substantially parallel to the axis X;
the upper shaft (14) passing through the carriage (13), substantially arranged at the axis Y and oriented in the direction Z;
the lower shaft (15) passing through the carriage (13), substantially arranged at the axis Y and oriented in a direction Z;
the first return pulley (16) integrally keyed onto the lower shaft (15) on the front side (7) of the translational-rotary machine (1);
the first toothed wheel (17) integrally keyed onto the lower shaft (15) on the rear side (8) of the translational-rotary machine (1);
the second return pulley (18) idly mounted onto the upper shaft (14) on the rear side (8) of the translational-rotary machine (1);
a second toothed wheel (19) idly mounted onto the upper shaft (14) on the rear side (8) of the translational-rotary machine (1), said second toothed wheel (19) being integral with the second return pulley (18);
the first transmission member (20) which operatively connects said first pair of pulleys (11, 11'), the first pair of tension pulleys (9, 9') and the first return pulley (16);
the second transmission member (21) which operatively connects said second pair of pulleys (12, 12'), the second pair of tension pulleys (10, 10') and the second return pulley (18);
and wherein the first toothed wheel (17) is operatively meshed with the second toothed wheel (19).

2. The translational-rotary machine (1) according to claim 1, wherein a respective pulley (11', 12) of each of said first (11, 11') and second (12, 12') pairs of pulleys is operatively connected to the respective first and second motor means (4, 4') by means of gear motors, and wherein the remaining two pulleys (11, 12') are instead idly mounted.

3. The translational-rotary machine (1) according to claim 2, wherein the pulleys (11', 12) connected to the first and second motor means (4, 4') are symmetrically arranged on the support structure (5).

4. The translational-rotary machine (1) according to claim 1, wherein both the first and second motor means (4, 4') are placed on the same side as the support structure (5), the pulley (11') of the first pair of pulleys and the pulley (12) of the second pair of pulleys are connected, by means of a worm screw-helical cylindrical wheel coupling, to the first and second motor means (4, 4').

5. The translational-rotary machine (1) according to claim 3, wherein the driving pulley (11') and the idler pulley (12') are keyed onto the same shaft, and the driving pulley (12) and the idler pulley (11) are mounted onto a further same shaft, and wherein the idler pulleys (11, 12') are mounted onto respective shafts by means of bearings so as to release said idler pulleys (11, 12') from the rotation of the driving pulleys (11', 12) integrally keyed onto the respective shafts.

6. The translational-rotary machine (1) according to claim 1, wherein the carriage (13) is slidable on a track (22) placed on a vertical plane and along the axis X, and the track (22) comprises a lower rail (23) and an upper rail (24).

7. The translational-rotary machine (1) according to claim 1, wherein the first and the second pairs of tension pulleys (9, 9') and (10, 10') are mounted to the carriage (13), wherein the pulleys (9, 9', 10, 10') are keyed onto the ends of respective shafts (27, 27'), and wherein said shafts (27, 27') cross the carriage (13) in a direction transverse to the axis Y.

8. The translational-rotary machine (1) according to claim 1, wherein a toothing (25) is formed on the lower shaft (15), at the centerline of the lower shaft (15), and wherein a toothed reduction wheel (26) is integrally keyed onto the upper shaft (14), at the centerline of the upper shaft (14), so as to mesh with the toothing (25) on the lower shaft (15).

9. The translational-rotary machine (1) according to claim 8, wherein the toothing (25) and the toothed reduction wheel (26) have different diameters from each other so as to form a motion reduction system.

10. The translational-rotary machine (1) according to claim 9, wherein the toothed reduction wheel (26) has a greater diameter than the toothing (25) so as to reduce a rotation speed of the upper shaft (14) with respect to a rotation speed of the lower shaft (15).

11. The translational-rotary machine (1) according to claim 1, wherein on the front side (7) of the translational-rotary machine (1), the first transmission member (20) winds in the order:
about the pulley (11') of the first pair of pulleys (11, 11'),
about the pulley (9') of the first pair of tension pulleys (9, 9'),
about the first return pulley (16),
about the pulley (9) of the first pair of tension pulleys (9, 9'),
and finally
about the pulley (11) of the first pair,
so that the lower shaft (15) receives the motion from the first return pulley (16) on the front side (7), the force transmitted by the transmission member (20) acting on the lower section of the return pulley (16);
and wherein, on the rear side (8) of the translational-rotary machine (1), the second transmission member (21) winds in the order:
about the pulley (12) of the second pair of pulleys (12, 12'),
about the pulley (10) of the second pair of tension pulleys (10, 10'),
about the second return pulley (18),
about the pulley (10') of the second pair of tension pulleys (10, 10'),
and finally
about the pulley (12') of the second pair,
so that the lower shaft (15) receives the motion on the rear side (8) from the second toothed wheel (19) which is integral with the second return pulley (18), the force transmitted by the transmission member (21) acting on the upper section of the first toothed wheel (17).

12. The translational-rotary machine (1) according to claim 1, carrying out the following movements:
when the first and second motor means (4, 4') actuate the driving pulleys (11', 12) so that they have a concordant angular speed and with equal modulus, the first return pulley (16) and the first toothed wheel (17) are subjected to equal forces in opposite directions, whereby the lower shaft (15) rotates but the carriage (13) does not translate;
when the first and second motor means (4, 4') actuate the driving pulleys (11', 12) so that they have discordant angular speed and with equal modulus, the first return pulley (16) and the first toothed wheel (17) are subjected to equal forces in equal directions, whereby the lower shaft (15) does not rotate and the carriage (13) translates in the direction of the force applied;

when the first and second motor means (4, 4') actuate the driving pulleys (11', 12) so that they have either concordant or discordant angular speeds but with different modulus, there is a translational-rotary movement resulting from the combination of the movements described in points a) and b).

13. The translational-rotary machine (1) according to claim 1, wherein shaped seats (32), (32)', which are adapted to insert and connect various types of tools to the translational-rotary machine (1), are formed at the ends of the upper shaft (14).

14. The translational-rotary machine (1) according to claim 13, wherein a pair of handles (33), (33)', or accessories of other type, can be connected to the upper shaft (14) by means of corresponding cranks (34, 34').

15. A translational-rotary machine (1) comprising a first and second motor means (4, 4') and translational-rotary members (3), wherein the translational-rotary members (3) comprise:
   a movable carriage (13);
   a lower shaft (15) passing through the carriage (13);
   a first return pulley (16) integrally keyed onto the lower shaft (15) on a front side (7) of the translational-rotary machine (1);
   an upper shaft (14) passing through the carriage (13), said upper shaft (14) being vertically aligned with the lower shaft (15);
   a toothed reduction wheel (26) integrally keyed onto the upper shaft (14);
   a second upper shaft (38) passing through the carriage (13), said second upper shaft (38) being vertically aligned with the lower shaft (15) and the upper shaft (14), and being arranged above the lower shaft (15) and the upper shaft (14);
   a second return pulley (18) integrally keyed onto the second upper shaft (38) on a rear side (8) of the translational-rotary machine (1);
   a first transmission member (20) arranged on the front side (7) of the translational-rotary machine (1), said first transmission member (20) being adapted to operatively connect the first and second motor means (4, 4') to the first return pulley (16);
   a second transmission member (21) arranged on the rear side (8) of the translational-rotary machine (1), said second transmission member (21) being adapted to operatively connect the first and second motor means (4, 4') to the second return pulley (18);
   wherein the first return pulley (16), the toothed reduction wheel (26) and the second return pulley (18) are operatively connected to one another;
   wherein the force transmitted by the first transmission member (20) acts on a lower section of the first return pulley (16);
   and wherein the force transmitted by the second transmission member (21) acts on an upper section of the second return pulley (18);
   a frame (2) on which translational-rotary members (3) are mounted, which are configured to move limbs of the user, said translational-rotary members (3) being operatively connected to the first and second motor means (4, 4'), wherein the frame (2) comprises a support structure (5) for the translational-rotary members (3), which extends along a longitudinal axis X,
   wherein the translational-rotary members (3) comprise:
   a first pair of pulleys (11, 11') arranged on the front side (7) of the translational-rotary machine (1), at the ends of the support structure (5), the pulleys (11, 11') of said first pair being aligned along an axis which is substantially parallel to the axis X;
   a second pair of pulleys (12, 12') arranged on the rear side (8) of the translational-rotary machine (1), at the ends of the support structure (5), the pulleys (12, 12') of said second pair being aligned along an axis which is substantially parallel to the axis X;
   the carriage (13) which is movable along the axis X, wherein said carriage (13) has a symmetry axis Y of the carriage which is perpendicular to the axis X;
   wherein said carriage (13) comprises:
   a first pair of tension pulleys (9, 9') arranged on said carriage (13), on the front side (7) of the translational-rotary machine (1), the tension pulleys (9, 9') of said first pair being arranged along an axis which is substantially parallel to the axis X;
   a second pair of tension pulleys (10, 10') arranged on said carriage (13), on the rear side (8) of the translational-rotary machine (1), the tension pulleys (10, 10') of said second pair being arranged along an axis which is substantially parallel to the axis X;
   the upper shaft (14) passing through the carriage (13), substantially arranged at the axis Y and oriented in the direction Z;
   the lower shaft (15) passing through the carriage (13), substantially arranged at the axis Y and oriented in a direction Z;
   the first return pulley (16) integrally keyed onto the lower shaft (15) on the front side (7) of the translational-rotary machine (1);
   the first toothed wheel (17) integrally keyed onto the lower shaft (15) on the rear side (8) of the translational-rotary machine (1);
   the second return pulley (18) idly mounted onto the upper shaft (14) on the rear side (8) of the translational-rotary machine (1);
   a second toothed wheel (19) idly mounted onto the upper shaft (14) on the rear side (8) of the translational-rotary machine (1), said second toothed wheel (19) being integral with the second return pulley (18);
   the first transmission member (20) which operatively connects said first pair of pulleys (11, 11'), the first pair of tension pulleys (9, 9') and the first return pulley (16);
   the second transmission member (21) which operatively connects said second pair of pulleys (12, 12'), the second pair of tension pulleys (10, 10') and the second return pulley (18);
   and wherein the first toothed wheel (17) is operatively meshed with the second toothed wheel (19).

16. A translational-rotary machine (1) comprising a first and second motor means (4, 4') and translational-rotary members (3), wherein the translational-rotary members (3) comprise:
   a movable carriage (13);
   a middle shaft (42) passing through the carriage (13);
   a first return pulley (16) integrally keyed onto the middle shaft (42) on a front side (7) of the translational-rotary machine (1);
   a second return pulley (18) integrally keyed onto the middle shaft (42) on a rear side (8) of the translational-rotary machine (1);
   a first transmission member (20) arranged on the front side (7) of the translational-rotary machine (1), said first transmission member (20) being adapted to operatively connect the first and second motor means (4, 4') to the first return pulley (16);
a second transmission member (21) arranged on the rear side (8) of the translational-rotary machine (1), said second transmission member (21) being adapted to operatively connect the first and second motor means (4, 4') to the second return pulley (18);
wherein the force transmitted by the first transmission member (20) acts on a lower section of the first return pulley (16);
and wherein the force transmitted by the second transmission member (21) acts on an upper section of the second return pulley (18);
a frame (2) on which translational-rotary members (3) are mounted, which are configured to move limbs of the user, said translational-rotary members (3) being operatively connected to the first and second motor means (4, 4'), wherein the frame (2) comprises a support structure (5) for the translational-rotary members (3), which extends along a longitudinal axis X,
wherein the translational-rotary members (3) comprise:
a first pair of pulleys (11, 11') arranged on the front side (7) of the translational-rotary machine (1), at the ends of the support structure (5), the pulleys (11, 11') of said first pair being aligned along an axis which is substantially parallel to the axis X;
a second pair of pulleys (12, 12') arranged on the rear side (8) of the translational-rotary machine (1), at the ends of the support structure (5), the pulleys (12, 12') of said second pair being aligned along an axis which is substantially parallel to the axis X;
the carriage (13) which is movable along the axis X, wherein said carriage (13) has a symmetry axis Y of the carriage which is perpendicular to the axis X;
wherein said carriage (13) comprises:
a first pair of tension pulleys (9, 9') arranged on said carriage (13), on the front side (7) of the translational-rotary machine (1), the tension pulleys (9, 9') of said first pair being arranged along an axis which is substantially parallel to the axis X;
a second pair of tension pulleys (10, 10') arranged on said carriage (13), on the rear side (8) of the translational-rotary machine (1), the tension pulleys (10, 10') of said second pair being arranged along an axis which is substantially parallel to the axis X;
the upper shaft (14) passing through the carriage (13), substantially arranged at the axis Y and oriented in the direction Z;
the lower shaft (15) passing through the carriage (13), substantially arranged at the axis Y and oriented in a direction Z;
the first return pulley (16) integrally keyed onto the lower shaft (15) on the front side (7) of the translational-rotary machine (1);
the first toothed wheel (17) integrally keyed onto the lower shaft (15) on the rear side (8) of the translational-rotary machine (1);
the second return pulley (18) idly mounted onto the upper shaft (14) on the rear side (8) of the translational-rotary machine (1);
a second toothed wheel (19) idly mounted onto the upper shaft (14) on the rear side (8) of the translational-rotary machine (1), said second toothed wheel (19) being integral with the second return pulley (18);
the first transmission member (20) which operatively connects said first pair of pulleys (11, 11'), the first pair of tension pulleys (9, 9') and the first return pulley (16);
the second transmission member (21) which operatively connects said second pair of pulleys (12, 12'), the second pair of tension pulleys (10, 10') and the second return pulley (18);
and wherein the first toothed wheel (17) is operatively meshed with the second toothed wheel (19).

17. A machine for physically exercising limbs, comprising a translational-rotary machine (1) according to claim 1.

* * * * *